US012769658B2

(12) United States Patent
Stonelake et al.

(10) Patent No.: US 12,769,658 B2
(45) Date of Patent: Oct. 20, 2026

(54) LIMITED WRITE COMPLETION RETURN FOR RATE CONTROL IN A MEMORY SUB-SYSTEM WITH SINGLE-LEVEL CELL MEMORY CACHING

(71) Applicant: Micron Technology, Inc., Boise, ID (US)

(72) Inventors: Paul Roger Stonelake, Kihei, HI (US); Ramkumar Venkatachalam, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/791,202

(22) Filed: Jul. 31, 2024

(65) Prior Publication Data

US 2026/0037444 A1 Feb. 5, 2026

(51) Int. Cl.
*G06F 12/08* (2016.01)
*G06F 12/0802* (2016.01)

(52) U.S. Cl.
CPC .................... *G06F 12/0802* (2013.01)

(58) Field of Classification Search
CPC .................... G06F 12/0802
USPC .................... 711/118
See application file for complete search history.

(56) References Cited

U.S. PATENT DOCUMENTS

| | | | | |
|---|---|---|---|---|
| 10,095,628 | B2 | 10/2018 | Ash et al. | |
| 2012/0159051 | A1* | 6/2012 | Hida | G06F 12/0246 711/E12.008 |
| 2016/0077968 | A1 | 3/2016 | Sela et al. | |
| 2019/0026191 | A1 | 1/2019 | Battaje et al. | |
| 2019/0065388 | A1 | 2/2019 | Christensen et al. | |
| 2019/0220201 | A1* | 7/2019 | Jia | G06F 12/023 |
| 2019/0369899 | A1 | 12/2019 | Tanpairoj et al. | |
| 2020/0401513 | A1 | 12/2020 | He et al. | |
| 2020/0401514 | A1 | 12/2020 | Liang et al. | |
| 2022/0342826 | A1 | 10/2022 | Cariello | |
| 2025/0077102 | A1* | 3/2025 | Dutta | G06F 3/0608 |

* cited by examiner

*Primary Examiner* — Hua J Song
(74) *Attorney, Agent, or Firm* — Lowenstein Sandler LLP

(57) ABSTRACT

Processing logic in a memory sub-system receives, from a host system, a plurality of write commands for writing data to the memory device. Upon writing the data to a cache of the memory device, the processing logic generates a plurality of completion entries, the plurality of completion entries corresponding to the plurality of write commands and comprising respective timestamps, wherein the respective timestamps are based on a target host-to-cache data rate, and sends the plurality of completion entries to the host system based on the respective timestamps.

20 Claims, 8 Drawing Sheets

700

| HOST GEAR | CACHE FREE SPACE | H2C RATE | C2D RATE |
|---|---|---|---|
| ACCUMULATING | FS > 70% | =1.04*C2D TARGET RATE | STOP |
| STEADY | 70% > FS > 30% | =1*C2D TARGET RATE | STOP |
| EMPTYING | 30% > FS > 5% | =0.75*C2D TARGET RATE | START |
| THROTTLED | 5% > FS | =0.25*C2D TARGET RATE | START |

FIG. 7

LIMITED WRITE COMPLETION RETURN FOR RATE CONTROL IN A MEMORY SUB-SYSTEM WITH SINGLE-LEVEL CELL MEMORY CACHING

TECHNICAL FIELD

Embodiments of the disclosure relate generally to memory sub-systems, and more specifically, relate to rate control in a memory sub-system with single-level cell memory caching.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 7 is a chart illustrating host operating gears for elastic configuration of data rate control parameters in a memory sub-system in accordance with some embodiments of the present disclosure.

DETAILED DESCRIPTION

Figure 1:
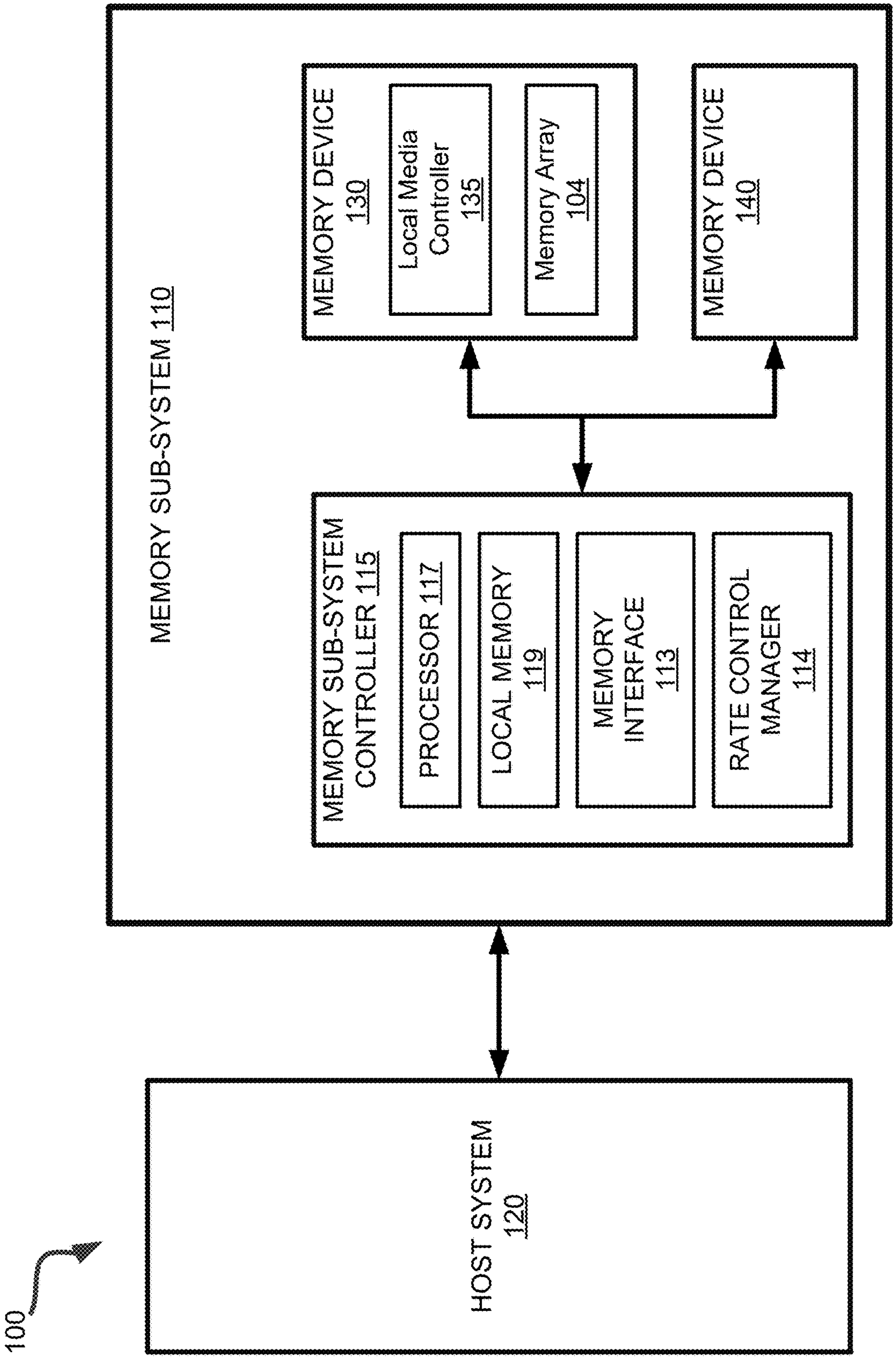
FIG. 1 illustrates an example computing system that includes a memory sub-system in accordance with some embodiments of the present disclosure.

Aspects of the present disclosure are directed to rate control in a memory sub-system with single-level cell memory caching. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

One example of a memory sub-system is a solid-state drive (SSD) that includes one or more non-volatile memory devices and a memory sub-system controller to manage the non-volatile memory devices. Each non-volatile memory device can include one or more arrays of memory cells. One type of memory cell, for example, single level cell (SLC) memory can store one bit per cell. Other types of memory (i.e., xLC memory), such as multi-level cells (MLCs), triple level cells (TLCs), and quad-level cells (QLCs), can store two, three, and four bits per cell, respectively. Each cell stores data by maintaining a specific charge level within the cell, which corresponds to a voltage level. These voltage levels represent the binary data stored in the cells, with SLC having two levels (for 0 and 1), MLC four levels (for 00, 01, 10, 11), TLC eight levels (for 000 to 111), and QLC sixteen levels (for 0000 to 1111). Enhanced memory density offers numerous advantages; for example, Quad-Level Cell (QLC) technology, which stores four bits per cell, delivers increased storage capacity at a reduced cost per gigabyte. This makes it a compelling choice for scenarios where large storage capacity and affordability are prioritized over peak performance, such as in database applications.

Since writing to QLC memory takes a relatively long time to ensure the precision and accuracy of the programming levels, host write performance may suffer. For example, the host system may send write commands at a faster rate than the corresponding data can be written to the QLC memory. Accordingly, some memory sub-system utilize a memory buffer, which may be implemented using SLC memory for example, and can be referred to as the "cache band." Host data can be written to the cache band at a much faster rate, which reduces or eliminates any latency experienced by the host system. Generally the cache band is relatively small in size, however, so the data originally written to the cache band may later be migrated to the QLC memory, which can be referred to as the "data band." As data is invalidated in either the cache band or the data band, the memory sub-system can perform memory management operations (e.g., garbage collection) to free space and make room for new host data. These operations can be referred to herein as folding operations.

In such a memory sub-system, the rates of data transfer are largely dependent on one another, including the rate at which data is written to the cache band (i.e., the host-to-cache or "H2C" rate), the rate at which data is written to the data band (i.e., the cache-to-data or "C2D" rate), and the rates at which folding operations are performed within the data band (i.e., the data-to-data or "D2D" rate) and within the cache band (i.e., the cache-to-cache or "C2C" rate). For example, the H2C rate is dependent on the C2D rate (as well as the C2C rate), which is itself dependent on the D2D rate. Many memory sub-system lack adequate control mechanisms these various data rates, which can hurt memory sub-system performance. For example, such memory sub-systems lack the ability to configure the different data rates based on free space in the cache band and/or data band, host write status, C2D target rate, maximum H2C rate, etc. Accordingly, there can be significant variance in the H2C rate, which introduces unwanted latency and hurts the overall quality of service experienced by the host system.

Aspects of the present disclosure address the above and other deficiencies by providing rate control in a memory sub-system with single-level cell memory caching. In one embodiment, the memory sub-system is initially configured with default H2C and C2D rates. Processing logic in the memory sub-system can, however, dynamically update either a target H2C or a target C2D rate during operation of the memory sub-system. For example, the processing logic can modify the target data rates to ensure that adequate free space is maintained in both the cache band and the data band to accommodate write data from the host system and provide consistent bandwidth over time. In addition, the processing logic can control the C2C and D2D rates to ensure that the C2D rate corresponds properly to the free space availability and the host bandwidth utilization.

In some cases, where the target H2C rate is lower than the default rate, the processing logic in the memory sub-system may takes steps to limit the rate of host writes in order to achieve the target H2C rate. Since the write-bandwidth range supported by the memory sub-system is relatively wide (e.g., 50 MB/s to 3000 MB/s), very fine control of the host write rate is needed (i.e., beyond limiting the number of dies being programmed). This, in one embodiment, fractional die programming is implemented by delaying the return of write completion entries from the memory sub-system to the host system. As write commands are received from the host system and processed in the cache band, corresponding completion entries can be added to a completion queue maintained by firmware on the memory sub-system. Each completion entry has a corresponding timestamp representing a time at which it can be returned to the host system, where this time is determined in view of the target H2C rate. Thus, the completion entries are returned to the host system only when the corresponding timestamps satisfy a threshold criterion based on the current time. By limiting the rate at which the completion entries are returned to the host system, the host system will in turn be limited as to when it can send additional write commands to the memory sub-system, which allows the target H2C rate to be achieved.

In addition, the elastic nature of the cache band can be used to maintain efficient operation of the memory sub-system and provide consistent host write performance. In one embodiment, the processing logic utilizes a gear-based approach for cache band rate control in the memory sub-system. The processing logic can select a particular gear based, for example, on the amount of free space available in the cache band. In each different gear, there can be variations in operation. For example, when the amount of free space is relatively high, the processing logic may stop or reduce migration of data from the cache band to the data band in order to maintain a consistent level of free space in the cache band. In addition, the processing logic may throttle the H2C rate as the amount of free space in the cache band decreases (e.g., due to increased host workload). This elasticity provides a cushion to pause and restart C2D and D2D folding when the host system is not utilizing the full allocated write bandwidth or to recover from a program failure in the data band without having to decrease the H2C rate.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a memory interface 113 that is responsible for handling interactions of memory sub-system controller 115 with the memory devices of memory sub-system 110, such as memory device 130 and memory device 140. For example, the memory interface 113 can send memory access commands corresponding to requests received from host system 120 to memory device 130 and memory device 140, such as program commands, read commands, or other commands. In addition, the memory interface 113 can receive data from memory device 130 or memory device 140, such as data retrieved in response to a read command or a confirmation that a program command was successfully performed. In some embodiments, the memory sub-system controller 115 includes at least a portion of the memory interface 113. For example, the memory sub-system controller 115 can include a processor 117 (processing device) configured to execute instructions stored in local memory 119 for performing the operations described herein.

In one embodiment, the memory sub-system 110 includes a rate control manager 114 that manages the different data rates in memory sub-system 110, including, for example, the H2C rate, the C2D rate, the C2C rate, and the D2D rate. For example, rate control manager 114 can modify the target data rates to ensure that adequate free space is maintained in both the cache band and the data band of memory device 130 to accommodate write data from the host system 120 and provide consistent bandwidth over time. In one embodiment, rate control manager 114 can limit the rate at which the host system 120 is sending write commands (i.e., the H2C rate) by limiting the rate at which completion entries are returned to the host system 120, which will in turn limit when the host system 120 can send additional write commands to the memory sub-system 110. In addition, rate control manager 114 may utilize a gear-based approach for cache band rate control in the memory sub-system 110. For example. Rate control manager 114 can select a particular gear based on the amount of free space available in the cache band and make corresponding changes to the different data rates based on the gear. Additional details with regard to the operations of memory interface 113 and rate control manager 114 are described below with respect to FIGS. 2-8.

Figure 2:
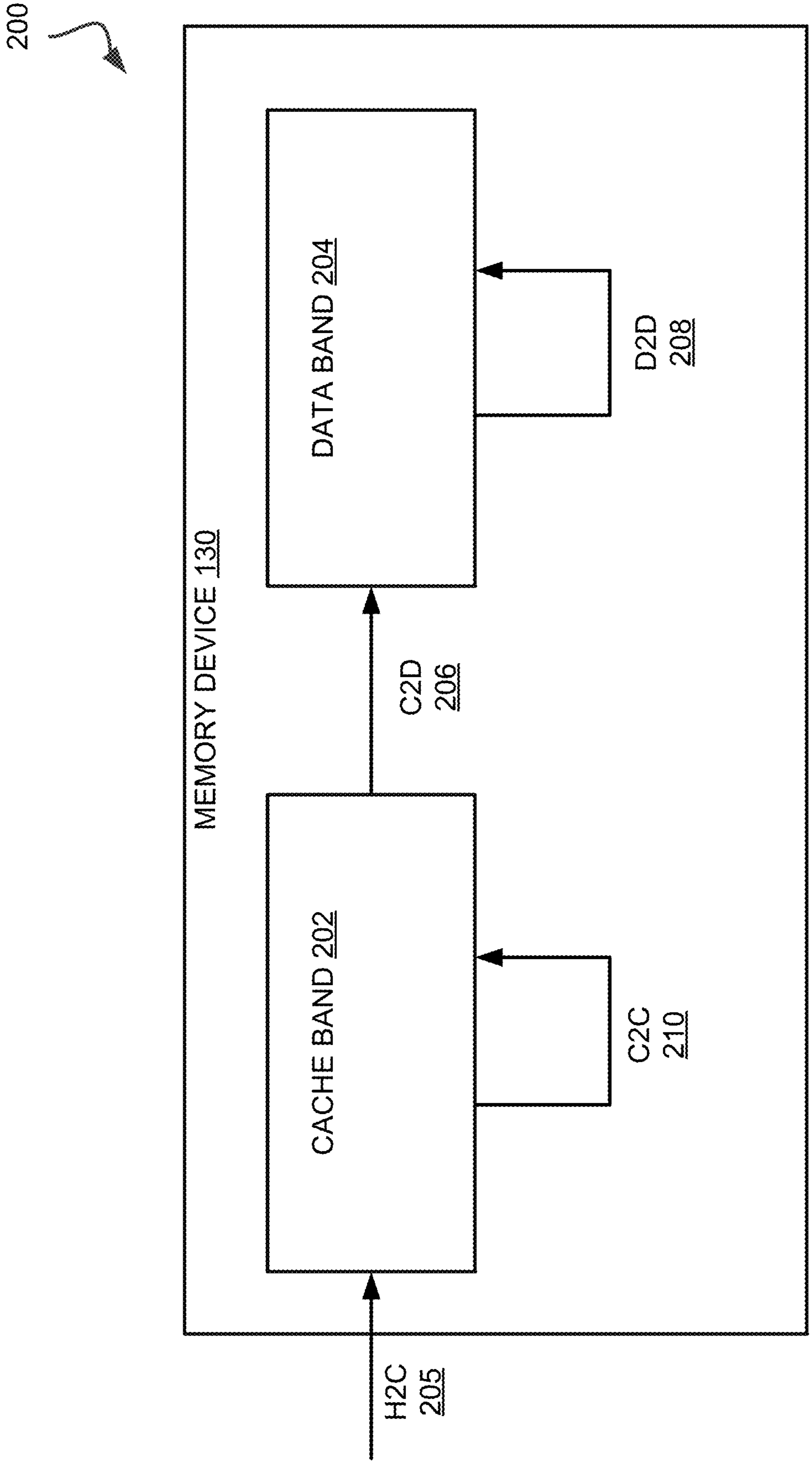
FIG. 2 is a block diagram of an example structure of a memory device with single-level cell memory caching in accordance with embodiments of the present disclosure.

FIG. 2 is a block diagram 200 of an example structure of a memory device, such as memory device 130, with single-level cell memory caching in accordance with embodiments of the present disclosure. In some embodiments, the memory device 130 comprises a cache band 202, configured to store a first number of bits per memory cell (e.g., implemented using SLC memory storing one bit per cell) and a data band 204, configured to store a second number of bits per memory cell (e.g., implemented using QLC memory storing four bits per cell). In some embodiments, the second number of bits per memory cell of the data band 204 is greater than the first number of bits per memory cell of the cache band 202. In other embodiments, some other memory type can be used to implement the data band 204, such as MLC memory, TLC memory, etc.

In some embodiments, the cache band 202 and the data band 204 are associated with a single memory device 130. In other embodiments, the cache band 202 and the data band 204 are located on separate memory devices. In some embodiments, the cache band 202 and the data band 204 each span across multiple memory devices. Some implementations implement a hybrid approach where the cache band 202 is on a dedicated device, while the data band 204 spans multiple devices, and vice versa.

In addition, the block diagram 200 includes directions 205, 206, 208, and 210 to illustrate example media management operations, in accordance with some embodiments of the present disclosure. In one embodiment, data received from a host system, such as host system 120, is initially written by memory sub-system controller 115 into the cache band 202. This operation is represented by 205 (i.e., host-to-cache or "H2C"). Since the cache band 202 is implemented using SLC memory, writing to the cache band 202 is relatively fast and the rate at which data is written to the cache band 202 (i.e., the H2C rate) can be fast enough to limit any latency experienced by the host. The cache band 202 may be smaller in size than the data band 204, however, and thus can fill up relatively quickly. Accordingly, the data in cache band 202 may be later migrated to the data band 204. This operation is represented by 206 (i.e., cache-to-data or "C2D"). Since the data band 202 is implemented using QLC memory, in one embodiment, writing to the data band 204 is relatively slow and the rate at which data is written to the data band 204 (i.e., the C2D rate) may introduce a higher latency.

Possible media management operations can further include "folding." Folding is a media management operation performed by the processing logic involving rearranging and consolidating memory segments to clear space occupied by "garbage" (invalid) data that is no longer in use. Folding merges smaller memory chunks into larger blocks to minimize fragmentation and wasted space in the memory device. For example, as holes are formed in the data band 204 as a result of data being invalidated and garbage collection operations being performed, folding operations can occur within the data band 204, which may be represented by 208 (i.e. data-to-data or "D2D"). Similarly, although perhaps less common, as data in the cache band 202 is invalidated, folding operations can be performed, which may be represented by 210 (i.e. cache-to-cache or "C2C").

Figure 3:
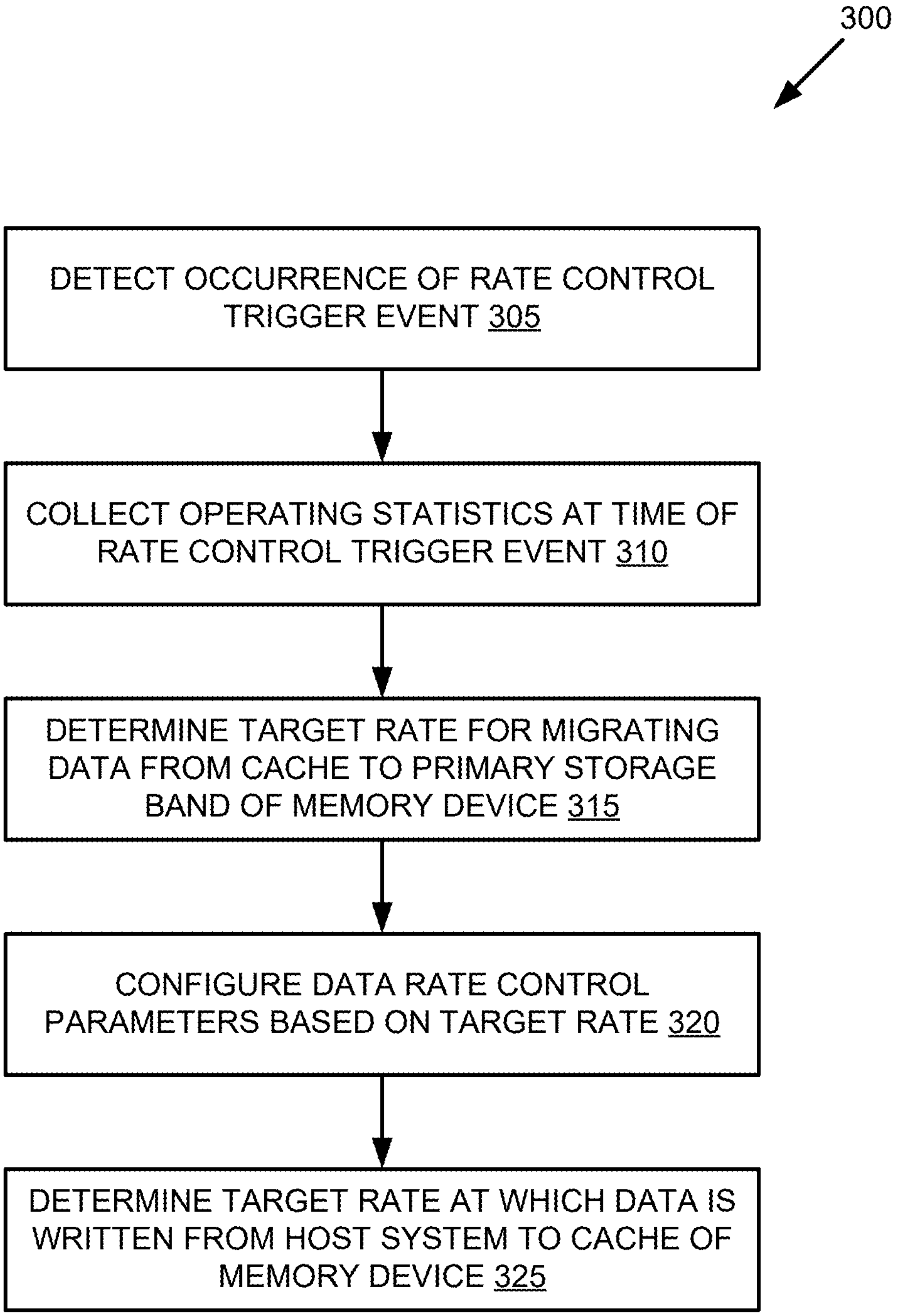
FIG. 3 is a flow diagram of an example method of rate control in a memory sub-system with single-level cell memory caching in accordance with some embodiments of the present disclosure.

FIG. 3 is a flow diagram of an example method of rate control in a memory sub-system with single-level cell memory caching in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory interface 113 and/or rate control manager 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., rate control manager 114) detects an occurrence of a rate control trigger event in memory sub-system 110. As described above, memory sub-system 110 includes one or more memory devices, such as memory device 130, each of which can include a cache (e.g., cache band 202) and a primary storage band (e.g., data band 204). The rate control trigger event can vary depending on the implementation but can include, for example, the expiration of a periodic interval (e.g., measured by a timer or counter), the selection of a new segment for folding data within the primary storage band (e.g., for D2D folding within data band 204), or selection of a new destination in the primary storage band for storing the data migrated from the cache band 202.

At operation 310, the processing logic collects one or more operating statistics of the system at a time of the rate control trigger event. Depending on the embodiment, rate control manager 114 can collect at least one of an amount of free space in the primary storage band (e.g., data band 204), an amount of valid data in the primary storage band, or an amount of data written by a host system, such as host system 120, to the cache band 202 of the memory device 130.

At operation 315, the processing logic determines, based on the one or more operating statistics, a target rate for migrating data from the cache to the primary storage band of the memory device. The target rate may be a rate that seeks to balance, for example, the amount of free space in the primary storage band of the memory device with the amount of data written by the host system to the cache of the memory device. For example, rate control manager 114 can compare the amount of free space in data band 204 to a target amount of free space in data band 204, where the target amount represents the free space required for the memory sub-system to function optimally when H2C, C2D, D2D, and metadata write operations are performed in parallel. The target C2D rate may change over time, and is thus recalculated based on the operating statistics of the memory sub-system 110 at the time that each new rate control trigger event occurs. There can also be a provision for a loss of free space if any errors (e.g., program failures) happen during the write operation on a given block stripe.

At operation 320, the processing logic configures one or more data rate control parameters of the system based on the target rate for migrating data from the cache to the primary storage band of the memory device. In one embodiment, rate control manager 114 can adjust a rate at which data is folded within the primary storage band of the memory device (i.e., D2D rate 208). For example, rate control manager 114 can use the average rate of valid data in the primary storage band for the last N D2D victims and the next N D2D victims to determine how fast or slow the D2D rate 208 should be relative to the C2D rate 206. Since the D2D rate 208 directly impacts the amount of free space in the data band 204, the D2D rate 208 can be adjusted as needed in view of the target C2D rate 206 to ensure that enough free space is available in data band 204 to accommodate the new data written from cache band 202.

At operation 325, the processing logic determines, based on the target rate for migrating data from the cache to the primary storage band of the memory device, a target rate at which data is written from a host system to the cache of the memory device (i.e., a target H2C rate 205). Since the H2C rate 205 is impacted by the amount of free space in the cache band 202, as well as the C2D rate 206 representing how fast data is migrated from the cache band 202 to the data band 204, an update to the target C2D rate 206 at operation 315 may necessitate an update to the H2C rate 205. Accordingly, rate control manager 114 can update both rates in sequence.

Figure 4:
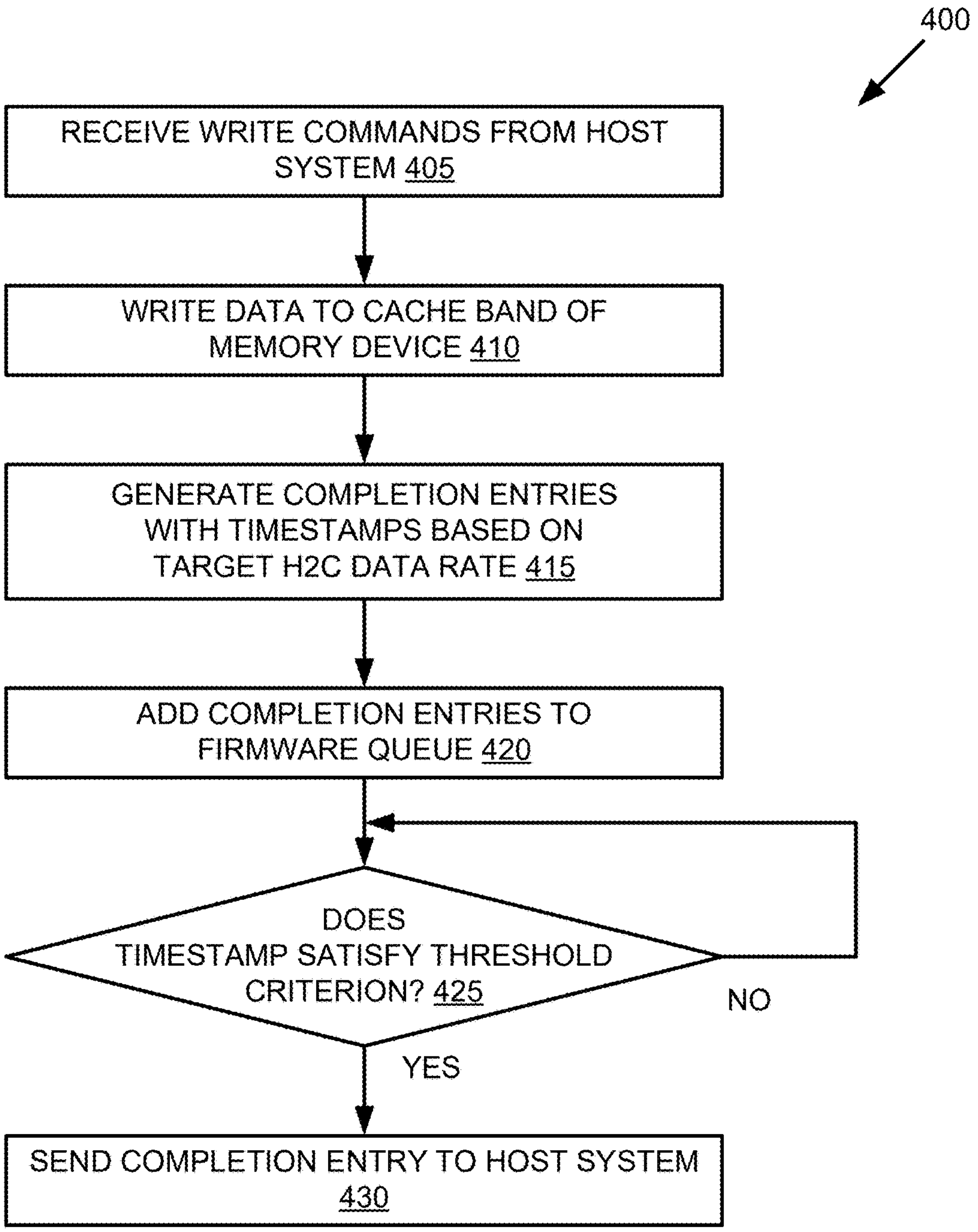
FIG. 4 is a flow diagram of an example method of controlling a rate at which a host system writes data to a cache of a memory sub-system using the return of completion entries to the host system in accordance with some embodiments of the present disclosure.

FIG. 4 is a flow diagram of an example method of controlling a rate at which a host system writes data to a cache of a memory sub-system using the return of completion entries to the host system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory interface 113 and/or rate control manager 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic receives, from a host system, a plurality of write commands for writing data to a memory device, such as memory device 130. For example, host system 120 can send a series of write commands to memory sub-system 110, which are received by memory sub-system controller 115 and subsequently sent (e.g., my memory interface 113) to memory device 130.

At operation 410, the processing logic writes the data to a cache of the memory device 130. In one embodiment, memory interface 113 writes the data to free space in cache band 202 according to the H2C rate 205.

At operation 415, the processing logic generates a plurality of completion entries corresponding to the plurality of write commands and comprising respective timestamps, where the respective timestamps are based on a target host-to-cache data rate. The completion entries provide an indication to the host system 120 that the write commands were successfully performed and receipt of the completion entries prompts the host system 120 to send additional memory access commands. In some embodiments, the host system 120 may be prevented from sending additional memory access commands to the memory sub-system 110 until the completion entries for the previously sent write commands are received.

In some embodiments, the respective timestamps associated with the completion entries represent future times when the plurality of completion entries are to be sent to the host system 120. These timestamps can be based on a target host-to-cache data rate (i.e., H2C rate 205) for the memory device 130. The H2C rate 205 is in in turn based on one or more of an amount of free space in the cache band 202 of the memory device, a rate at which data is migrated from the cache band to a primary storage band (i.e., data band 204) of the memory device, or a rate at which data is folded within the primary storage band of the memory device. By delaying the sending of the completion entries to the host system 120 based on the respective timestamps, the rate control manager 114 can effectively control the rate at which new data is written to the cache band 202 from the host system 120.

Figure 5:
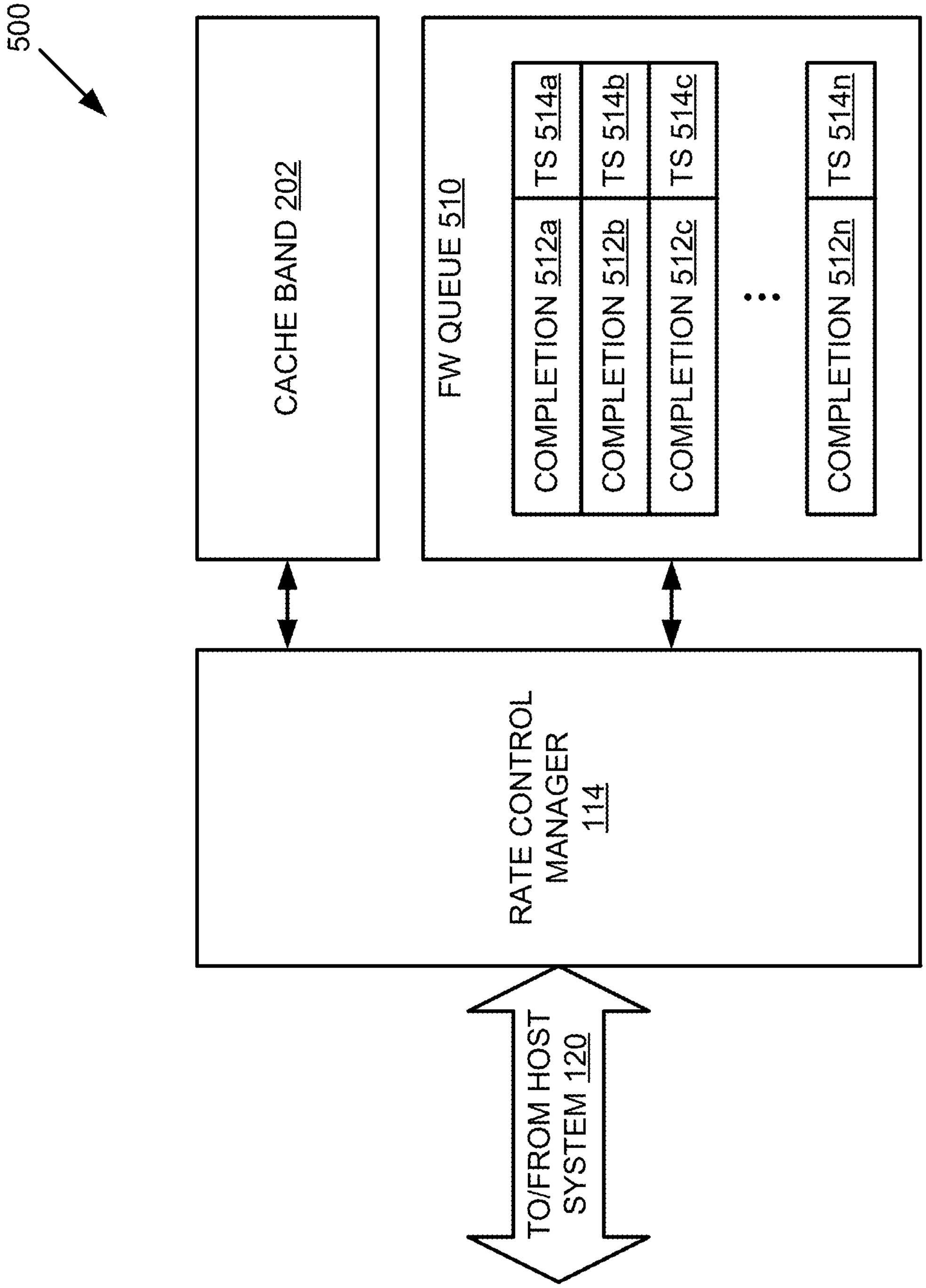
FIG. 5 is a block diagram illustrating a firmware queue storing completion entries for controlling a rate at which a host system writes data to a cache of a memory sub-system in accordance with some embodiments of the present disclosure.

At operation 420, the processing logic adds the plurality of completion entries to a firmware queue in the system, wherein the plurality of completion entries are ordered in the firmware queue based on the respective timestamps. FIG. 5 is a block diagram illustrating an example firmware queue 510 storing completion entries 512 for controlling a rate at which the host system 120 writes data to the cache band 202. As illustrated, queue 510 can include a number of different completion entries 512*a-n* corresponding to the different write commands being processed, and each completion entry can include a respective timestamp 514*a-n*. As indicated above, rate control manager 114 can calculate the timestamps 514*a-n* to control when the corresponding completion entries 512*a-n* are returned to the host system 120. In one embodiment, the completion entries 512*a-n* can be ordered in queue 510 according to the respective timestamps 514*a-n*. For example, the first completion entry 512*a* may be the earliest respective timestamp 514*a*, such that the second completion entry 512*b* has a later respective timestamp 514*c*, and so on.

Referring again to FIG. 4, at operation 425, the processing logic determines whether the respective timestamp of a first completion entry in the firmware queue satisfies a threshold criterion with respect to a current time. In one embodiment, the threshold criterion is satisfied if the respective timestamp (e.g., timestamp 514*a*) of the first completion entry (e.g. completion entry 512*a*) is within a threshold amount (e.g., +/−10%) of a current time. If the processing logic determines the respective timestamp of a first completion entry in the firmware queue does not satisfy the threshold criterion, the processing cycle repeats and the respective timestamp is subsequently checked again at a later time.

In response to determining that the respective timestamp of the first completion entry in the firmware queue 510 satisfies the threshold criterion with respect to the current time, at operation 430, the processing logic sends the first completion entry 512*a* in the firmware queue to the host system 120. In response, the host system may send, at the target host-to-cache data rate 205, one or more additional write commands. The processing operations 425 and 430 can repeat for any additional completion entries present in firmware queue 510.

Figure 6:
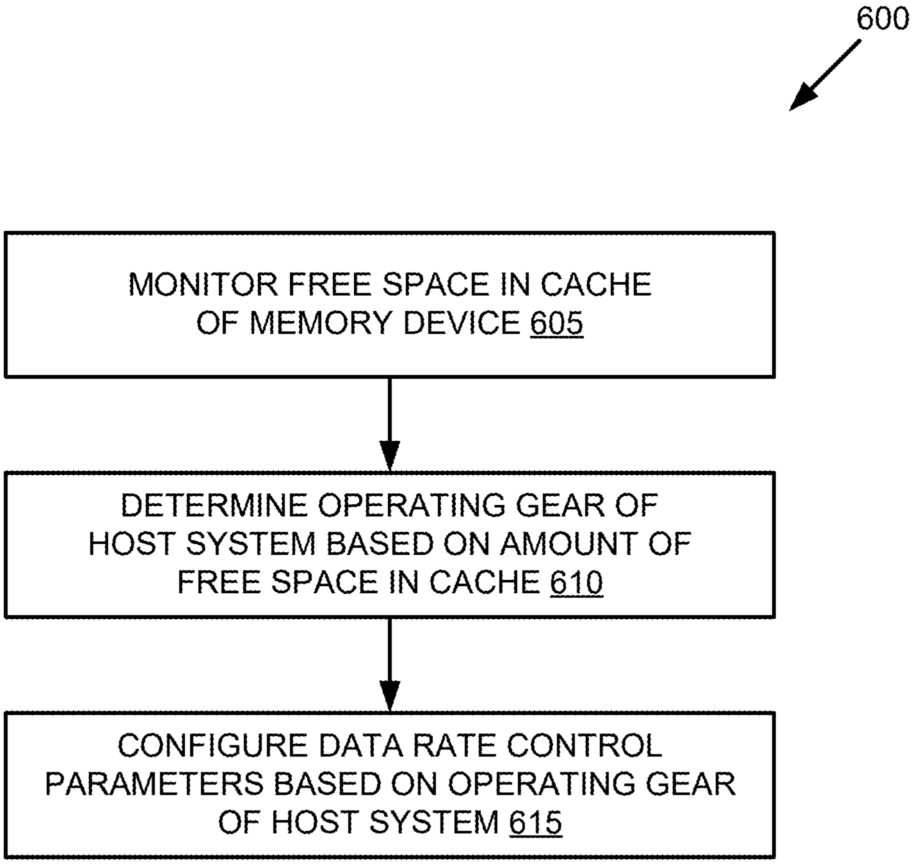
FIG. 6 is a flow diagram of an example method of elastic configuration of data rate control parameters in a memory sub-system in accordance with some embodiments of the present disclosure.

FIG. 6 is a flow diagram of an example method of elastic configuration of data rate control parameters in a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory interface 113 and/or rate control manager 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing logic (e.g., rate control manager 114) monitors an amount of free space in a cache, such as cache band 202, of the memory device 130. Over time, as data is written to the memory device 130 by host system 120, the data is written to the cache band 202, thereby reducing the amount of free space. In addition, as data is migrated from the cache band 202 to the data band 204, and a cache band folding operation (e.g., garbage collection) is performed, additional free space is created. Thus, the amount of free space fluctuates continuously while the memory device 130 is in use, and the rate control manager 114 can track this free space at various points in time.

At operation 610, the processing logic determines an operating gear of a host system based on the amount of free space in the cache of the memory device. In one embodiment, the rate control manager 114 can compare the amount of free space (i.e., the amount of the cache band 202 that is available to be written with host data) in the cache to respective threshold levels of free space corresponding to each of a plurality of operating gears. FIG. 7 is a chart illustrating host operating gears for elastic configuration of data rate control parameters in memory sub-system 110. In the example illustrated in FIG. 7 there are four host operating gears: Accumulating, Stead, Emptying, and Throttled. It should be appreciated that in other embodiments there can be any number of different and/or additional operating gears. As further illustrated, each host operating gear includes one or more threshold levels of free space, such as an upper threshold, a lower threshold, or upper and lower thresholds. For example, if the amount of free space in the cache band 202 is greater than 70% of the total capacity of the cache band 202, the rate control manager 114 can determine that the host system 120 is in the Accumulating gear. If the amount of free space in the cache band 202 is less than 70% and greater than 30%, the rate control manager 114 can determine that the host system 120 is in the Steady gear. If the amount of free space in the cache band 202 is less than 30% and greater than 5%, the rate control manager 114 can determine that the host system 120 is in the Emptying gear. If the amount of free space in the cache band 202 is less than 5%, the rate control manager 114 can determine that the host system 120 is in the Throttled gear.

Referring again to FIG. 6, at operation 615, the processing logic configures one or more data rate control parameters of the system based on the operating gear of the host system 120. In some embodiments, to configure the one or more data rate control parameters of the system the rate control manager 114 configures a rate at which data is migrated from the cache to a primary storage band of the memory device (i.e. the C2D rate 206). For example, this may include reducing the rate at which data is written from the host system to the cache of the memory device when the amount of free space in the cache is above a threshold level of free space. As illustrated in FIG. 7, for both the Accumulating and Steady gears the C2D rate 206 may be reduced or event stopped completely until the host system 120 reaches a lower gear, such as the Emptying or Throttled gear, when data migration from the cache band 202 to the data band 204 may be resumed. In addition, to configure the one or more data rate control parameters of the system the rate control manager 114 may configure a rate at which data is written from the host system 120 to the cache of the memory device (i.e., the H2C rate 205.) For example, this may include reducing the rate at which data is written from the host system 120 to the cache band 202 when the amount of free space in the cache is below a threshold level of free space. As illustrated in FIG. 7, for both the Emptying and Throttled gears the H2C rate 205 may be reduced until the host system 120 reaches a higher gear, such as the Steady or Accumulating gear, when the H2C rate 205 may be increased.

Figure 8:
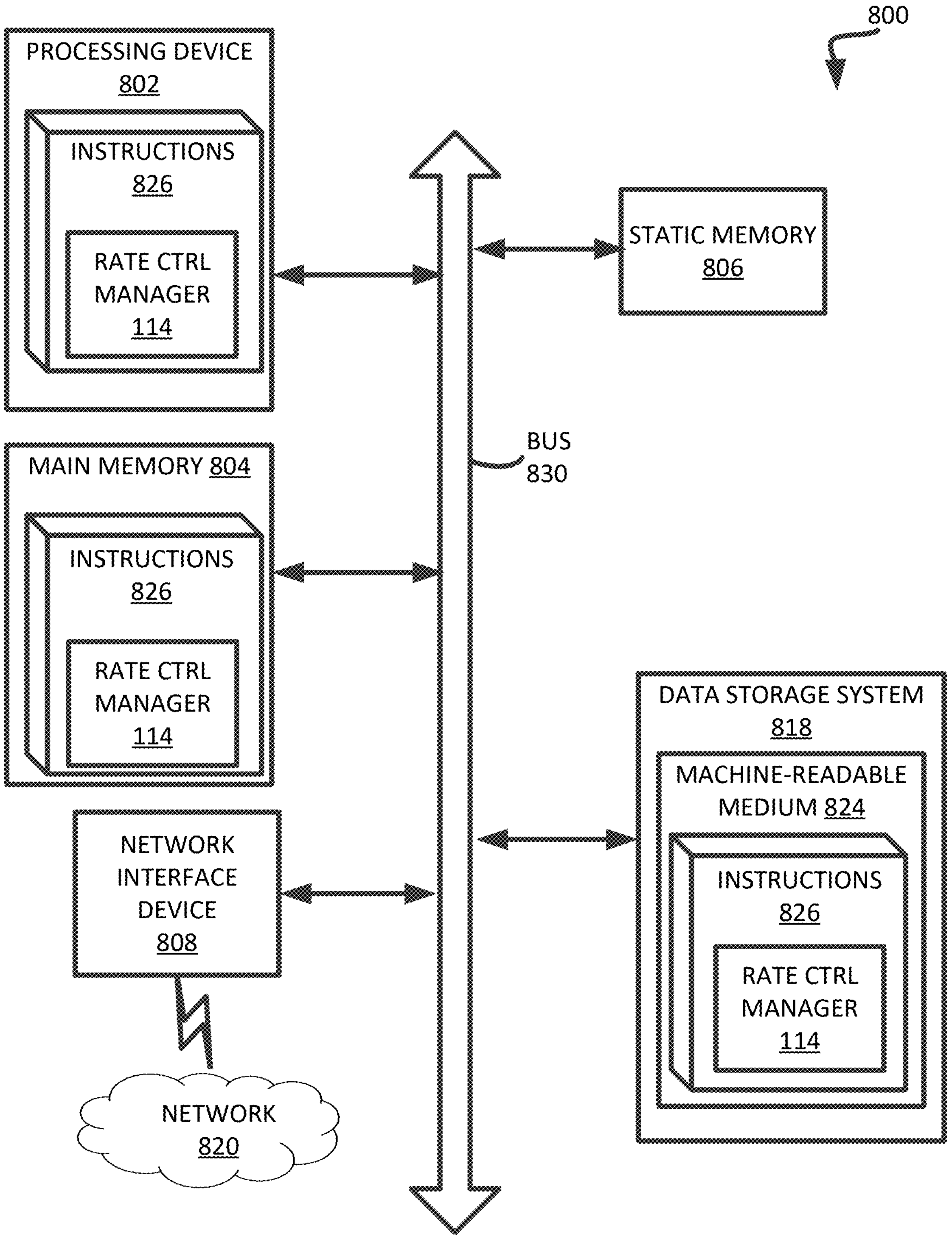
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute operations corresponding to the rate control manager 114 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to the rate control manager 114 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

receiving, from a host system, a plurality of write commands for writing data to the memory device;

upon writing the data to a cache of the memory device, generating a plurality of completion entries, the plurality of completion entries corresponding to the plurality of write commands and comprising respective timestamps, wherein the respective timestamps are calculated for the plurality of write commands based on an amount of available storage space in the cache and a target rate for migrating data from the cache to a primary storage band of the memory device, and wherein each respective timestamp represents a future time when a corresponding completion entry is to be sent to the host system to achieve a target host-to-cache data rate; and sending the plurality of completion entries to the host system based on the respective timestamps.

2. The system of claim 1, wherein the cache of the memory device comprises single-level-cell (SLC) memory.

3. The system of claim 1, wherein the respective timestamps represent future times when the plurality of completion entries are to be sent to the host system.

4. The system of claim 1, wherein the target host-to-cache data rate is further based a rate at which data is folded within the primary storage band of the memory device.

5. The system of claim 1, wherein the processing device is to perform operations further comprising:

adding the plurality of completion entries to a firmware queue in the system, wherein the plurality of completion entries are ordered in the firmware queue based on the respective timestamps.

6. The system of claim 5, wherein sending the plurality of completion entries to the host system based on the respective timestamps comprises:

determining whether the respective timestamp of a first completion entry in the firmware queue satisfies a threshold criterion with respect to a current time; and in response to determining that the respective timestamp of the first completion entry in the firmware queue satisfies the threshold criterion with respect to the current time, sending the first completion entry in the firmware queue to the host system.

7. The system of claim 1, wherein the host system is to send, at the target host-to-cache data rate, one or more additional write commands upon receiving the plurality of completion entries.

8. A method comprising:

receiving, from a host system, a plurality of write commands for writing data to a memory device;

upon writing the data to a cache of the memory device, generating a plurality of completion entries, the plurality of completion entries corresponding to the plurality of write commands and comprising respective timestamps, wherein the respective timestamps are calculated for the plurality of write commands based on an amount of available storage space in the cache and a target rate for migrating data from the cache to a primary storage band of the memory device, and wherein each respective timestamp represents a future time when a corresponding completion entry is to be sent to the host system to achieve a target host-to-cache data rate; and sending the plurality of completion entries to the host system based on the respective timestamps.

9. The method of claim 8, wherein the cache of the memory device comprises single-level-cell (SLC) memory.

10. The method of claim 8, wherein the respective timestamps represent future times when the plurality of completion entries are to be sent to the host system.

11. The method of claim 8, wherein the target host-to-cache data rate is further based a rate at which data is folded within the primary storage band of the memory device.

12. The method of claim 8, further comprising:

adding the plurality of completion entries to a firmware queue in the system, wherein the plurality of completion entries are ordered in the firmware queue based on the respective timestamps.

13. The method of claim 12, wherein sending the plurality of completion entries to the host system based on the respective timestamps comprises:

determining whether the respective timestamp of a first completion entry in the firmware queue satisfies a threshold criterion with respect to a current time; and in response to determining that the respective timestamp of the first completion entry in the firmware queue satisfies the threshold criterion with respect to the current time, sending the first completion entry in the firmware queue to the host system.

14. The method of claim 8, wherein the host system is to send, at the target host-to-cache data rate, one or more additional write commands upon receiving the plurality of completion entries.

15. A non-transitory computer-readable storage medium comprising instructions that, when executed by a processing device, cause the processing device to perform operations comprising:

receiving, from a host system, a plurality of write commands for writing data to a memory device;

upon writing the data to a cache of the memory device, generating a plurality of completion entries, the plurality of completion entries corresponding to the plurality of write commands and comprising respective timestamps, wherein the respective timestamps are calculated for the plurality of write commands based on an amount of available storage space in the cache and a target rate for migrating data from the cache to a primary storage band of the memory device, and wherein each respective timestamp represents a future time when a corresponding completion entry is to be sent to the host system to achieve a target host-to-cache data rate; and sending the plurality of completion entries to the host system based on the respective timestamps.

16. The non-transitory computer-readable storage medium of claim 15, wherein the respective timestamps represent future times when the plurality of completion entries are to be sent to the host system.

17. The non-transitory computer-readable storage medium of claim 15, wherein the target host-to-cache data rate is further based a rate at which data is folded within the primary storage band of the memory device.

18. The non-transitory computer-readable storage medium of claim 15, wherein the instructions cause the processing device to perform operations further comprising:

adding the plurality of completion entries to a firmware queue in the system, wherein the plurality of completion entries are ordered in the firmware queue based on the respective timestamps.

19. The non-transitory computer-readable storage medium of claim 18, wherein sending the plurality of completion entries to the host system based on the respective timestamps comprises:

determining whether the respective timestamp of a first completion entry in the firmware queue satisfies a threshold criterion with respect to a current time; and in response to determining that the respective timestamp of the first completion entry in the firmware queue satisfies the threshold criterion with respect to the current time, sending the first completion entry in the firmware queue to the host system.

20. The non-transitory computer-readable storage medium of claim 15, wherein the host system is to send, at the target host-to-cache data rate, one or more additional write commands upon receiving the plurality of completion entries.

* * * * *